United States Patent [19]

Bloom et al.

[11] Patent Number: 5,488,305

[45] Date of Patent: Jan. 30, 1996

[54] SYSTEM AND METHOD FOR HIGH-SPEED POTENTIOMETRY USING SCANNING PROBE MICROSCOPE

[75] Inventors: David M. Bloom, Portola Valley; Francis Ho, Stanford; Alfred S. Hou, Menlo Park, all of Calif.

[73] Assignee: The Board of Trustees of the Leland Stanford Junior University, Stanford, Calif.

[21] Appl. No.: 313,758

[22] Filed: Sep. 28, 1994

Related U.S. Application Data

[62] Division of Ser. No. 984,891, Dec. 2, 1992, Pat. No. 5,381,101.

[51] Int. Cl.$^6$ ................................................ G01B 5/28
[52] U.S. Cl. .................... 324/537; 324/750; 324/765; 250/306
[58] Field of Search ........................ 324/71.5, 96, 537, 324/750, 753, 762, 765, 662, 672, 76.11, 76.12, 76.38, 76.42; 73/105, 575, 618, 620; 250/306, 307

[56] References Cited

U.S. PATENT DOCUMENTS

| | | | |
|---|---|---|---|
| 4,745,362 | 5/1988 | Brust et al. | 324/158 R |
| 4,941,753 | 7/1990 | Wickramasinghe | 250/306 |
| 4,992,659 | 2/1991 | Abraham et al. | 250/306 |
| 5,065,103 | 11/1991 | Slinkman et al. | 324/158 R |

(List continued on next page.)

OTHER PUBLICATIONS

Anders et al., "Potentiometry for Thin–Film Structures using Atomic Force Microscopy", *J. Vac. Sci. Technol.* A8(1):394–399 (Jan./Feb. 1990).
Girard, "Developments in Voltage Contrast", *Scanning Microscopy* 2(1):151–160 (1988) Month Unavailable.
Gopinath et al., "Voltage Contrast: A Review", *Scanning Electron Microscopy* I:375–380 (1978) Month unavailable.
Grove, "Sampling for Oscilloscopes and Other RF Systems: Dc Through X–Band", *IEEE Transactions on Microwave Theory and Techniques* MTT–14(12):629–635 (1966) Month unavailable.
Hwang et al., "Applications of Scanning Kelvin Probe Force Microscope (SKPFM) for Failure Analysis", *ISTFA '92: The 18th International Symposium for Testing & Failure Analysis*, Los Angeles, California, pp. 9–14 (17–23 Oct. 1992).
Martin et al., "High–Resolution Capacitance Measurement and Potentiometry by Force Microscopy", *Appl. Phys. Lett.* 52(13):1103–1105 (1988) Month unavailable.
Nonnenmacher et al., "Kelvin Probe Force Microscopy", *Appl. Phys. Lett.* 58(25):2921–2923 (1991) Month unavailable.
Williams et al., "Scanning Capacitance Microscopy on a 25 nm Scale", *Appl. Phys. Lett.* 52(2):203–205 (1989) Month unavailable.

*Primary Examiner*—Kenneth A. Wieder
*Assistant Examiner*—Christopher M. Tobin
*Attorney, Agent, or Firm*—Flehr, Hohbach, Test, Albritton & Herbert

[57] ABSTRACT

A potentiometry apparatus for measuring a periodic electrical waveform existing proximate the surface of a sample such as a semiconductor wafer is disclosed herein. The potentiometry apparatus includes a pulse generator for generating a sequence of electrical pulses at a pulse frequency offset from the frequency of the surface waveform by a mixing frequency. A cantilever coupled to the pulse generator serves to carry the electrical pulses to a position proximate the surface of the sample. In a capacitive displacement mode the cantilever is mechanically displaced so as to generate a time-expanded representation of the electrical surface waveform having a repetition frequency equal to the mixing frequency. During displacement mode operation an optical detection circuit may be employed to monitor deflection of the cantilever. In a tunneling current mode the cantilever is again employed to carry the electrical pulses to a position proximate the surface of the sample. In this mode a tunneling current propagating through the cantilever at the mixing frequency provides a time,expanded representation of the electrical surface waveform.

15 Claims, 5 Drawing Sheets

U.S. PATENT DOCUMENTS

| | | | |
|---|---|---|---|
| 5,103,174 | 4/1992 | Wandass et al. | 324/244 |
| 5,185,572 | 2/1993 | Yagi et al. | 324/158 R |
| 5,267,471 | 12/1993 | Abraham et al. | 73/105 |
| 5,319,977 | 6/1994 | Quate et al. | 324/662 |
| 5,381,101 | 1/1995 | Bloom et al. | 324/676 |
| 5,397,896 | 3/1995 | Weiss et al. | 250/306 |

$$\frac{\text{Force}}{\text{Area}} = \frac{\varepsilon_0 V^2}{2H^2}$$

SYSTEM AND METHOD FOR HIGH-SPEED POTENTIOMETRY USING SCANNING PROBE MICROSCOPE

This application is a divisional of prior application Ser. No. 07/984,891 filed Dec. 2, 1992, now U.S. Pat. No. 5,381,101.

The present invention relates generally to the measurement of voltage potentials on the surfaces of electrical devices and circuits, and particularly to the measurement of high-frequency surface potentials.

BACKGROUND OF THE INVENTION

A number of techniques have been developed for characterizing the surface topography, voltage potential and capacitance distribution of semiconductor devices. These techniques have been developed in response to the advance of semiconductor technology, in which the dimensions of processed semiconductor devices are becoming ever smaller. This diminution in device scale renders both physical and electrical analyses more difficult to perform. Traditional methods of electrical measurement, such as direct mechanical probing, tend to become difficult or impossible to carry out at such reduced scale. Hence, efforts have been directed to devising electrical analysis instruments which are non-destructive, contactless, and which exhibit improved spatial resolution.

Included among recently developed electrical analysis instruments are microscopies based upon local interactions between a probe having a sharpened tip and a sample surface. Such interactions include electron tunneling, atomic force, magnetic force, as well as thermal, optical and electrostatic coupling. Atomic force microscopes, for example, operate by sensing minute deflections of a cantilever to which is attached an atomically sharp tip. In a non-contact mode, attractive forces between the tip and sample induce bending of the tip and cantilever to allow determination of surface potential (potentiometry). Similarly, in scanning tunneling microscopes potentiometry is effected by monitoring the tunneling current between the tip and sample.

Unfortunately, capacitance and potentiometry measurements performed using atomic force microscopes have been limited by the relatively slow mechanical response of the force-sensing cantilever and associated feedback electronics. Although scanning tunneling microscopes may be operated in a contact mode so as not to be limited by the mechanical response of the cantilever, conventional scanning tunneling microscopes have typically been employed to provide a measure of the average potential of high-speed signals present on the surface of a sample. That is, it has been required to use other techniques to provide the equivalent of an oscilloscope-like trace, i.e, a map of high-speed electrical waveforms present on the surface of a sample. Such high-speed potentiometry has been demonstrated using various microwave probes, but these have required contact pads on the order of 10 microns. Hence, probing techniques have been generally not be utilized in applications involving devices having dimensions on the order of only a few microns.

High-speed potentiometry has also been performed using optical techniques, in which a laser beam is modulated by a high-speed electrical waveform proximate the surface of a sample. However, the lateral resolution of optical potentiometry systems are limited by the diameter of the illuminating laser beams, which are typically on the order of two to three microns. Although high-speed potentiometry using electron beams is capable of yielding high resolution, space-charge effects are expected to place an upper limit on the speed of waveforms which may be analyzed using this technique. Moreover, electron-beam potentiometry requires that the sample be placed in a vacuum environment.

SUMMARY OF THE INVENTION

In summary, the present invention is a potentiometry apparatus for measuring a periodic electrical waveform existing proximate the surface of a sample such as a semiconductor wafer. In particular, the potentiometry apparatus includes a pulse generator for generating a sequence of electrical pulses at a pulse frequency offset from the repetition frequency of the surface waveform by a mixing frequency. A cantilever coupled to the pulse generator serves to carry the electrical pulses to a position proximate the surface of the sample. In a capacitive displacement mode the cantilever is mechanically displaced so as to generate a time-expanded representation of the electrical surface waveform having a repetition frequency equal to the mixing frequency. During displacement mode operation an optical detection circuit may be employed to monitor deflection of the cantilever.

In a tunneling current mode the cantilever is again employed to carry the electrical pulses to a position proximate the surface of the sample. In this mode a tunneling current propagating through the cantilever at the mixing frequency provides a time-expanded representation of the electrical surface waveform.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Introduction

The present invention provides a potentiometry technique capable of mapping high-frequency surface potentials at extremely fine resolution. As is discussed below, the high-speed potentiometry measurements contemplated by the present invention may be effected in a first operative mode by monitoring displacement of the cantilevered tip of an atomic force microscope. In a second operative mode high-speed potentiometry is carried out by sensing the tunneling current through the tip member of a scanning tunneling microscope.

In the first operative mode the mechanical displacement of the cantilever is made to replicate, at a much lower frequency, the shape of a periodic high-speed waveform at the surface of the sample. This is made possible by exploiting a square-law mixing interaction between a voltage potential impressed on the cantilevered microscope tip and the potential at the surface of the sample. For example, if the surface potential of interest has a repetition rate of X, then the application of a potential varying at the rate of X+ΔX to the cantilevered microscope tip results in periodic displacement thereof at the rate of ΔX. In this way the displacement of the microscope tip may be made to track, at a repetition rate of ΔX, a surface waveform varying at the rate of X.

In the second operative mode the high-speed waveform is replicated by a low-frequency mixing current flowing through the tunneling tip. As is explained below, this mixing current results from the nonlinear current-voltage characteristics of the tunneling tip. In the second operative mode the voltage applied to the microscope tip is selected such that the low-frequency variation of the mixing current mirrors the shape of the high-speed surface waveform.

Capacitive Displacement Mode

Figure 1:
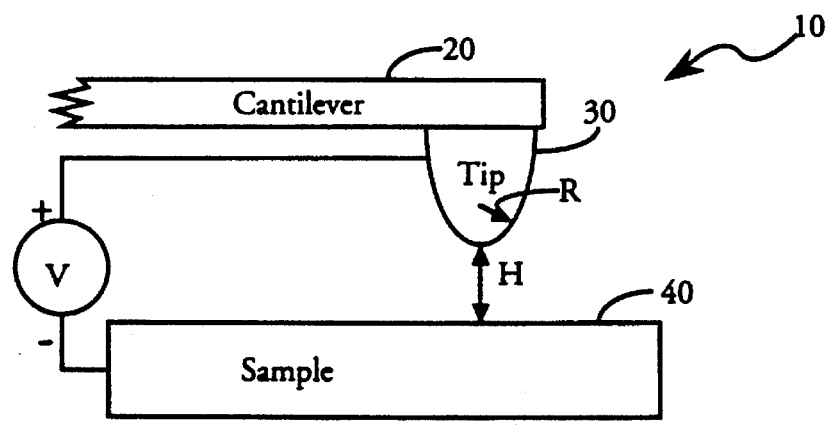
FIG. 1 shows a simplified side view of the cantilevered tip portion of an atomic force microscope.
Figure 2:
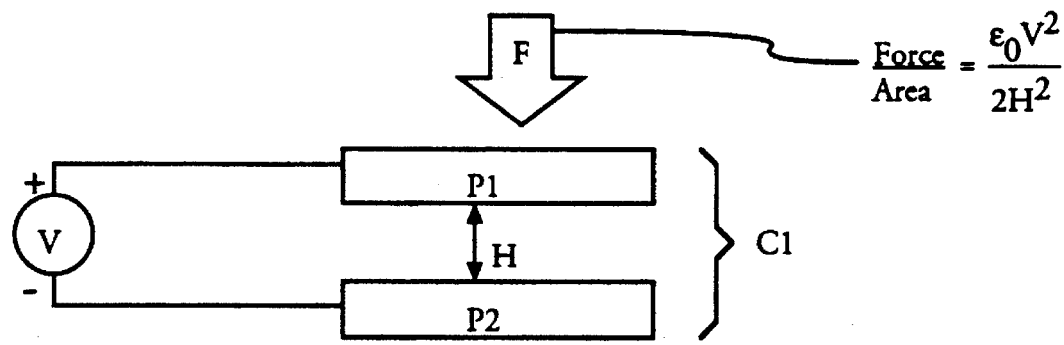
FIG. 2 depicts a capacitive model of the electrical relationship between the cantilevered microscope tip of an atomic force microscope and a sample.

The manner in which high-speed potentiometry is carried out in accordance with the first operative mode of the present invention may be conveniently described with reference to FIGS. 1 and 2. Referring to FIG. 1, there is shown a simplified side view of the cantilevered portion 10 of an atomic force microscope. The cantilevered portion 10 includes a cantilever arm 20, to which is attached an atomically sharp conductive tip 30 of radius R. The tip 30 is positioned at a height H over the surface of a sample 40. The electrical interaction between the tip 30 and the sample 40 can be approximated by a parallel-plate capacitor of effective area A, where $A = 2\pi R^2$. This relationship is illustrated in FIG. 2, in which plates P1 and P2 of a parallel-plate capacitor C1 respectively correspond to the microscope tip 30 and to the sample 40.

The presence of the voltage V between the tip 30 and the sample 40 gives rise to an attractive force F, where $$F = -(\epsilon_0 A V^2)/(2H^2) \quad (1)$$

and $\epsilon_0$ is the free-space permittivity constant. It is observed that the force F is dependent on the square of the voltage between the tip and the sample. Hence, if a "sampling" voltage is impressed upon the tip 30 there will arise a force term corresponding to the product, hereinafter referred to as the mixing product, of this sampling voltage and the voltage potential proximate the surface 40. Since displacement of the cantilever 20 is related to the force between the tip 30 and sample 40, cantilever 20 will be displaced in accordance with the force term arising out of this mixing product. As is discussed below, the frequency of the sampling voltage is selected such that the frequency of the mixing product is less than the mechanical response capability of the cantilever 20. In this way the capacitive relationship between the tip 30 and sample 40 effectively results in this configuration operating as a mechanical mixer.

Figure 3:
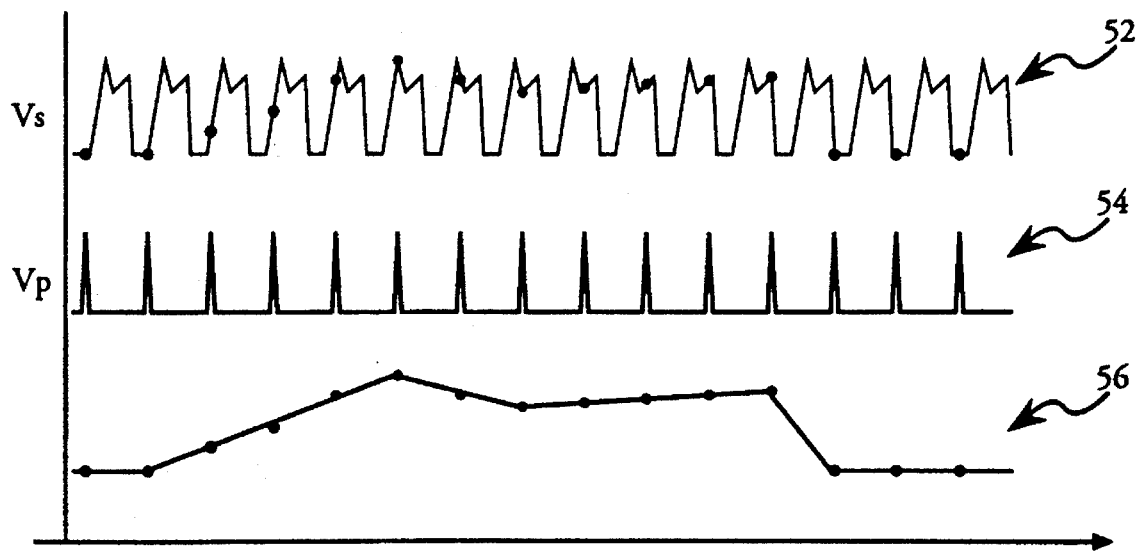
FIG. 3 depicts the manner in which capacitive mixing between a high-speed surface waveform and a pulsed sampling waveform applied to the cantilevered microscope tip may be utilized to generate a low-frequency representation of the high-speed surface waveform.

The manner in which this capacitive mixing may be utilized to effect high-speed measurements of surface potentials may be conveniently described with reference to FIG. 3. Specifically, waveform 52 depicts a high-speed signal $V_s$ of frequency f1, e.g., 1 gigahertz (GHz), existing proximate the surface of the sample 40 (FIG. 1). Waveform 54 represents a sequence of narrow sampling pulses $V_p$ at the frequency f1+Δf, wherein the waveform $V_p$ comprises the sampling voltage impressed on the tip 30. If the surface potential $V_s$ and sampling voltage $V_p$ are made to be referenced to a common ground, then the voltage across the gap between the tip 30 and the sample 40 is given by the voltage differential $V_p - V_s$.

Referring to equation (1), the force exerted on the cantilever 20 as a consequence of this voltage differential will include a component (herein called the mixing term) at the offset frequency Δf, as well as components at frequencies 2f1, 2f1+Δf, 2f1+2Δf and 0:

$$F \propto \{V_p(f1 + \Delta f) - V_s(f1)\}^2 = \alpha + \beta V_p^2(2f1 + 2\Delta f) + \quad (2)$$
$$\gamma V_s^2(2f1) + \delta V_p V_s(2f1 + \Delta f) + \zeta V_p V_s(\Delta f)$$

where α, β, γ, δ, and ζ are coefficients whose relative values are not significant for the purposes of this explanation. Since the resonant frequency of a typical machined cantilever is at or below 20 kilohertz (KHz), all the higher frequency components of the force exerted on the cantilever 20 are effectively filtered out by the cantilever 20, leaving only the component at the offset frequency Δf.

The frequency of the sampling voltage $V_p$ is selected such that the offset frequency Δf is within a range, e.g., 10 Hz to 15 KHz, encompassed by the mechanical response capability of the cantilever 20 and less than the mechanical resonant frequency thereof. As is illustrated by waveform 56, the displacement of the cantilever tracks the shape of the high speed surface potential $V_s$, but at a repetition frequency of Δf. It is noted that although the cantilever 20 may be displaced by a constant amount due to force terms varying at the frequency of $V_p$ and $V_s$, it will not exhibit periodic displacement in response thereto. That is, the components of the force on the cantilever at frequencies 2f1, 2f1+Δf and 2f1+2Δf will generally be far in excess of the mechanical response capability of the cantilever 20.

Tunneling Mode

Potentiometry measurement in the tunneling mode is based on the principle of quantum mechanical tunneling between the tip of a scanning tunneling microscope and the surface of a conductive sample. During operation in the tunneling mode the microscope tip is brought to a fixed position approximately 5 Angstroms above the surface of the sample. The current density J (μA/square Angstrom) through the microscope tip includes an exponential component, and is given by:

$$J = J_o(\phi_o - V/2)\exp[-A(\phi_o - V/2)^{-\frac{1}{2}}] \quad (3)$$

where $J_o = 6.165 d^{-2}$,

A=1.025d.

In equation (3) the parameter d (in units of Angstroms) corresponds to the width of the gap between the tip and sample, $\phi_o$ is the tunneling barrier height (Volts), and V is the voltage across the gap between the tip and sample.

Next assume that the surface waveform $V_s$ of frequency f1 exists proximate the sample surface, and that the sampling waveform $V_p$ of frequency f1+$\Delta$f is applied to microscope tip. As is indicated by equation (3), the tunneling current J is exponentially dependent upon the square of the gap voltage V, where $V=V_p-V_s$. It follows that the tunneling current will include a mixing term at the offset frequency $\Delta$f which replicates the shape of the surface waveform $V_s$ in the manner illustrated by FIG. 3. This mixing current through the microscope tip can then be extracted and measured using conventional electronics.

In an alternative mode of operation, the metal tip of a scanning tunnel microscope is brought in contact with the surface of a semiconductor sample so as to form a metal-semiconductor contact mixer. As in the non-contact mode of operation, the tunneling current J is a nonlinear function of the voltage difference between the sampling waveform $V_p$ and the surface.

Potentiometry Apparatus for Capacitive Displacement Mode

Figure 4:
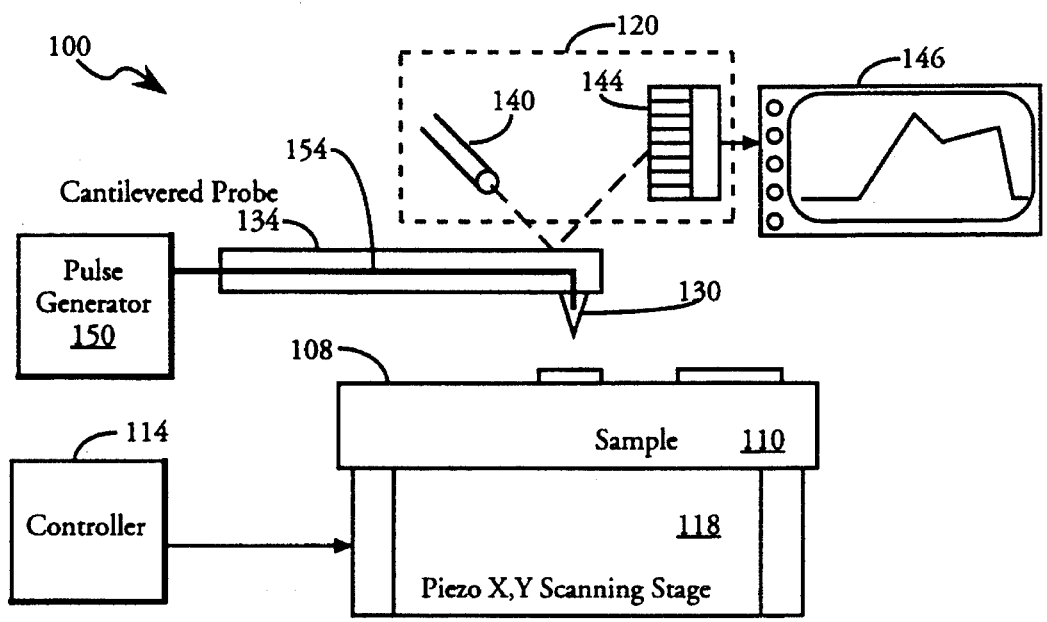
FIG. 4 shows a high-speed potentiometry system which, in accordance with the capacitive displacement technique of the present invention, is disposed to track the potential of signals proximate the featured surface of a semiconductor sample.

Referring to FIG. 4, there is shown a high-speed potentiometry system 100 which, in accordance with the capacitive displacement technique of the present invention, is disposed to track the potential of signals proximate the featured surface 108 of a semiconductor sample 110. The potentiometry system 100 includes a system controller 114 operatively connected to a conventional piezo X,Y scanning stage 118, and further includes cantilever position detection optics 120. In a preferred embodiment the controller 114 is implemented using a microprocessor or digital computer capable of supplying the requisite position control information to the X,Y scanning stage 118. The scanning stage 118 translates the sample 110 to a desired position relative to a cantilevered tip member 130 of a commercially available scanning probe microscope such as, for example, the Autoprobe microscope made by Park Scientific Instruments. The tip member 130 is coupled to a cantilever 134 disposed to be displaced as a consequence of the capacitive force between the tip member and sample 110. The tip member 130 is typically formed from a conductive material such as aluminum, or is coated with a conductive material. Furthermore, the tip member 130 may be an integral part of the cantilever 134, both formed using a sequence of photolithography processing steps on a semiconductor substrate.

Referring to FIG. 4, the detection optics 120 provides a detection signal indicative of the displacement of the tip member 130 relative to the surface 108 of the sample 110. The detection optics 120 includes a laser source 140 for illuminating the cantilever 134 with a focused optical beam. A portion of the beam reflected by the cantilever impinges upon a photosensitive surface of a conventional position detector 144. The resultant detection signal generated by the position detector 144 may then be displayed using a preamplifier (not shown) and oscilloscope 146 so as to provide a tip displacement waveform such as depicted in FIG. 3.

In relatively low-frequency applications, i.e., for surface waveforms $V_s$ at microwave frequencies and below, a pulse generator circuit 150 impresses the pulsed sampling waveform $V_p$ (FIG. 3) upon a standard wire transmission line 154 extending from the tip member 130 through the cantilever 134. Again, the frequency of the sampling waveform $V_p$ is selected to be offset by $\Delta$f from the repetition frequency of the surface potential $V_s$ in order that the cantilever 134 be subjected to a capacitive displacement force of frequency $\Delta$f.

As is described in detail below, in an embodiment of the inventive potentiometry system suitable for high-frequency applications (e.g., for surface signals with repetition frequencies above 50 Gigahertz) a portion of the pulse generator circuit 150 is implemented as an integrated circuit on a substrate operatively connected to the cantilever 134. In this implementation the high-frequency sampling waveform $V_p$ is applied to the tip member 130 with a high-frequency transmission line segment (e.g., coplanar waveguide) integrated with the cantilever 134, rather than by using standard low-frequency wire transmission line.

Potentiometry Apparatus for Tunneling Mode

Figure 5:
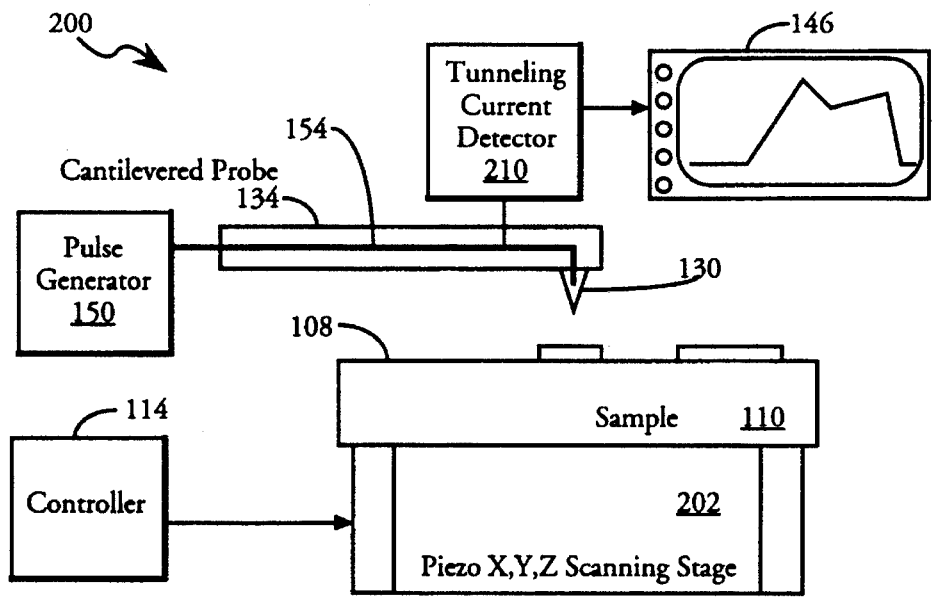
FIG. 5 depicts a high-speed potentiometry system designed to operate in accordance with the tunneling mode of the present invention.

FIG. 5 depicts a high-speed potentiometry system 200 designed to operate in accordance with the tunneling mode of the present invention. The tunneling mode system 200 is similar to the capacitive displacement mode system 100 in that the system controller 114 provides position control information to a conventional X,Y,Z translator/scanner 202.

The translator/scanner 202 moves a point of interest on the sample surface 108 to a predefined distance from the cantilevered tip member 130. In tunneling mode operation the cantilever 134, to which is coupled the tip member 130, is held in a fixed position and hence does not exhibit time-varying deflection relative to the sample surface 112.

In low-frequency applications the pulse generator circuit 150 impresses the pulsed sampling waveform $V_p$ (FIG. 3) directly upon a standard wire transmission line 154 extending from the tip member 130 through the cantilever 134. As discussed above, the tip member 130 conducts a tunneling current having a mixing component at an frequency equivalent to the frequency difference $\Delta$f between the surface potential $V_s$ and the pulsed waveform $V_p$. This component of the tunneling current is sensed and measured by a conventional current detection circuit 210, which will typically include a low pass filter having a cutoff frequency higher than the mixing frequency. Again, the tunneling current detected by the circuit 210 provides a low-frequency representation of the surface waveform $V_s$, and may be conveniently displayed using an oscilloscope 146.

High-Speed Potentiometry Apparatus

Figure 7:
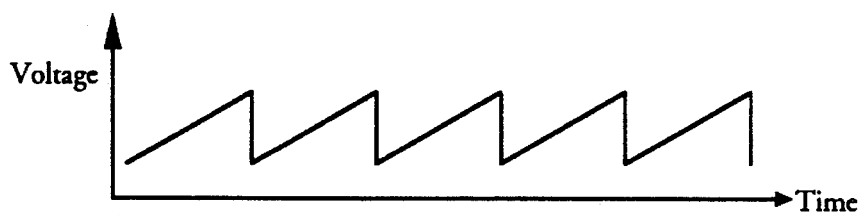
FIG. 7 provides a graphical representation of a sawtooth waveform produced by an edge-sharpening circuit integrated with the cantilevered microscope tip.
Figure 6:
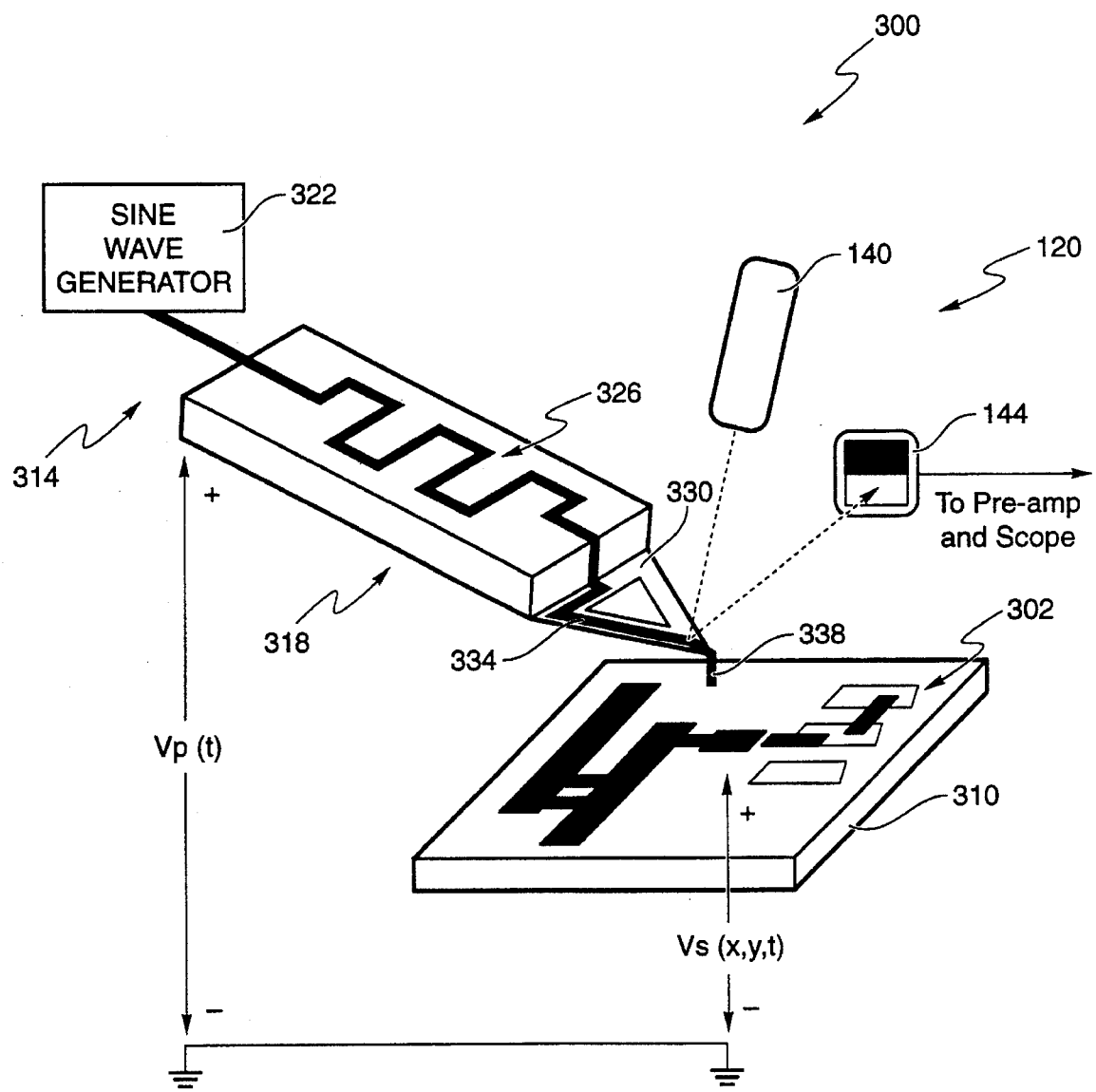
FIG. 6 shows a simplified illustrative representation of an embodiment of the potentiometry system suitable for measuring high-frequency surface potentials.

Referring to FIG. 6, there is shown a simplified illustrative representation of an embodiment of the potentiometry system 300 suitable for measuring high-frequency surface potentials. As shown in FIG. 6, the system 300 is configured to measure the potential $V_s(x,y,t)$ of a selected portion of a high-speed circuit 302 integrated on a semiconductor wafer 310. In the embodiment of FIG. 6 a scanning probe microscope is modified so as to include a pulse generator 314, a portion of which will preferably be realized by a gold (Au) deposition on a semiconductor substrate 318 composed of, for example, gallium arsenide (GaAs). In particular, the pulse generator 314 includes a sine wave generator 322 and a coplanar waveguide edge-sharpening circuit 326 integrated on semiconductor substrate 318. The edge-sharpening circuit 326 is designed to produce the sawtooth waveform of FIG. 7 in response to sinusoidal input from the sine wave generator 322. As is discussed below, the sawtooth waveform of FIG. 7 is converted to a pulsed sampling waveform such as that shown in FIG. 3 by connecting the microscope tip 338 to a coplanar waveguide short-circuit differentiator.

The system 300 further includes a silicon nitride microscope cantilever 330 (not drawn to scale) that includes the substrate 318, or is mechanically coupled to the substrate 318. A coplanar waveguide transmission line segment 334 linking the edge-sharpening circuit 325 with the microscope tip 338 is formed by a gold (Au) deposition on the silicon nitride cantilever 330. The line segment 334 preferably has a total signal path length of less than one millimeter. In this way extremely high-frequency pulse waveforms $V_p$, e.g., 40 to 100 GHz, may be coupled to the tip 338 from the pulse generator 314.

When operated in the capacitive displacement mode the high-speed potentiometry system 300 relies on the cantilever position detection optics 120 to provide a detection signal indicative of the displacement of the tip member 338 relative to the high-speed circuit 302. Again, the detection optics 120 are designed such that the portion of the beam from laser source 140 reflected by the cantilever 330 is incident upon the photosensitive surface of position detector 144. The resultant detection signal generated by the position detector 144 may then be displayed using a preamplifier and oscilloscope (not shown) so as to provide a tip displacement waveform such as is depicted in FIG. 3.

Figure 8:
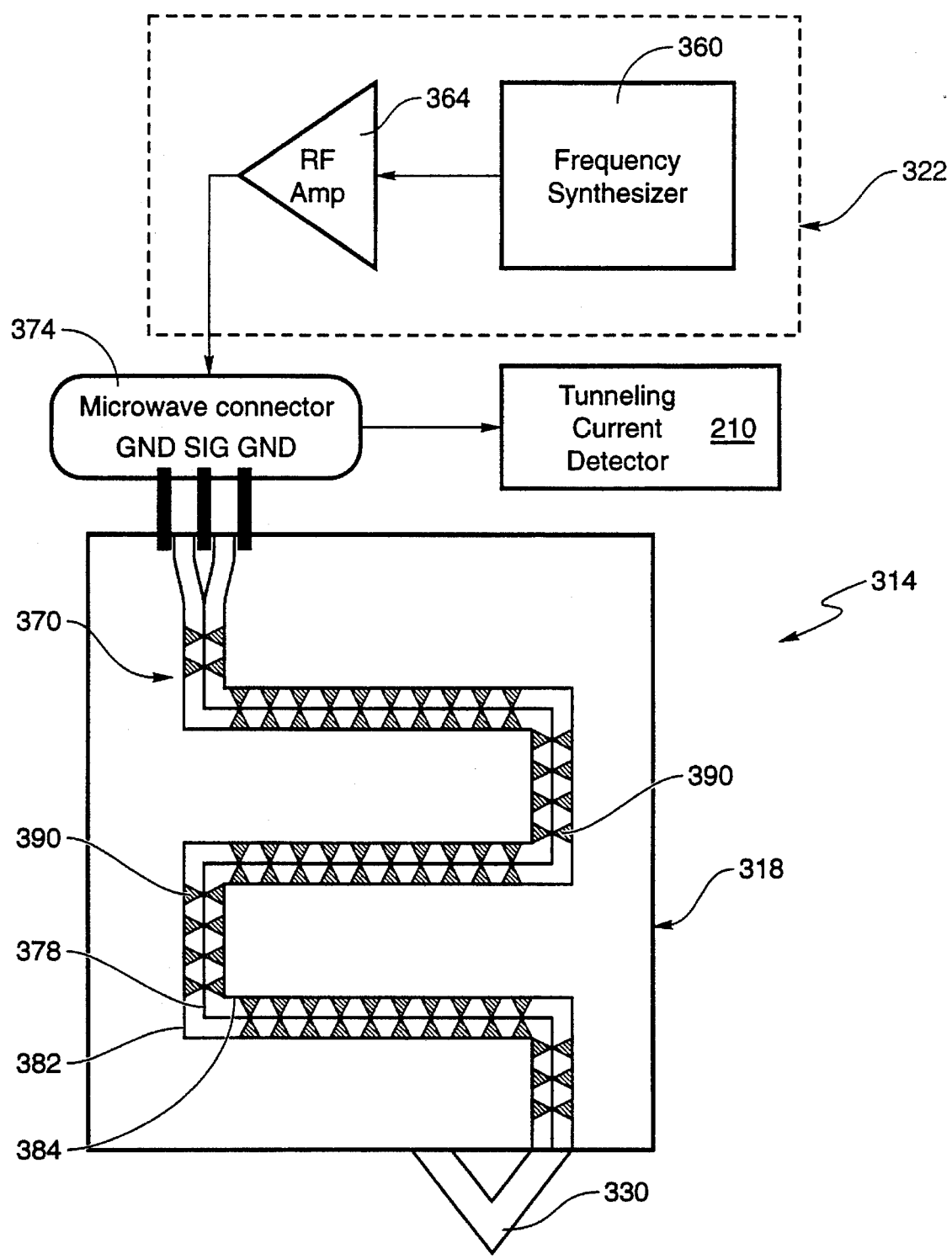
FIG. 8 shows a detailed representation of a sine wave generator and an edge-sharpening circuit included within a pulse generator.

Referring to FIG. 8, there is shown a more detailed representation of the sine wave generator 322 and edge-sharpening circuit 326 included within the pulse generator 314. Specifically, the sine wave generator 322 includes a frequency synthesizer 360 for providing a continuous wave sinusoidal drive voltage to an RF amplifier. In applications involving surface waveforms of up to approximately 20 GHz a microwave frequency synthesizer such as the Hewlett Packard 8340A may be employed in conjunction with an RF amplifier capable of producing a 1 to 2 Watt output signal. The amplified sine wave generated by the RF amplifier 364 is coupled to the 50 ohm coplanar waveguide transmission line 370 included within the edge-sharpening circuit 326 by a microwave connector 374. The microwave connector 374 includes a signal probe (SIG) connected to a signal line 378 of the transmission line 370, and a pair of ground probes (GND) connected to ground lines 382 and 384.

In the embodiment of FIG. 8 the signal 378 and ground lines 382, 384 of the coplanar waveguide transmission line 370 comprise depositions of gold (Au) on the gallium arsenide (GaAs) substrate. The transmission line 370 further includes a plurality of diodes 390, each of which is also formed by gold (Au) deposition on substrate 318, for effecting the nonlinear transfer characteristic required to generate the sawtooth waveform of FIG. 8. It should be noted that the illustration of the transmission line shown in FIG. 8 provides a generalized representation of a coplanar waveguide implementation thereof, but is not intended to be indicative of the specific circuit topology required by particular applications. It is nonetheless anticipated that substrates on the order of 2 square millimeters will provide sufficient surface area to accommodate a large number of desired transmission line layout topologies.

Figure 9:
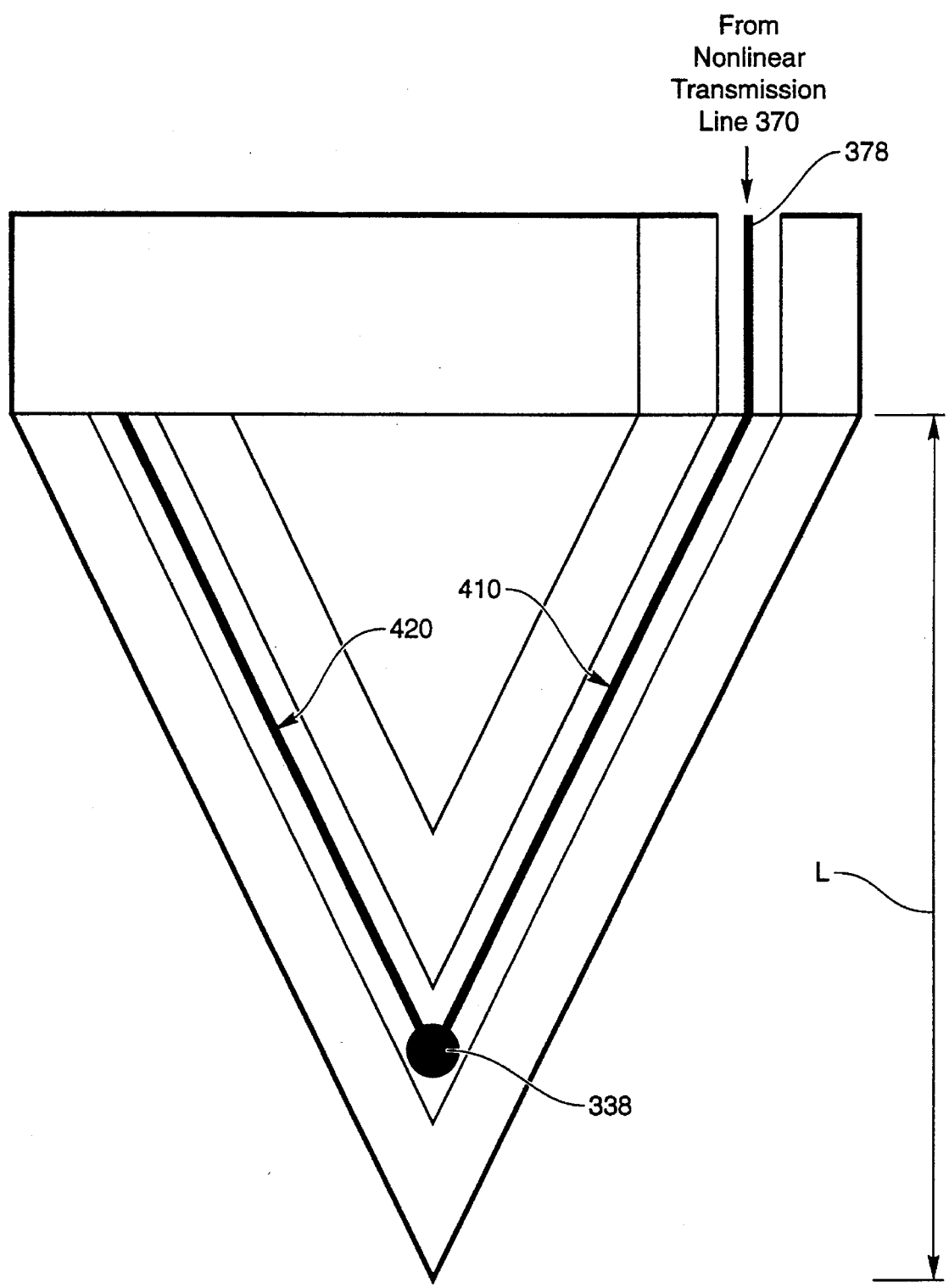
FIG. 9 depicts a magnified view of an underside surface of the cantilevered tip portion of an atomic probe microscope which has been modified to include a short-circuit differentiator in accordance with the present invention.

As is indicated in FIG. 8, the cantilever 330 (not drawn to scale) is mechanically coupled to the substrate 318 and is electrically connected to the transmission line 370. FIG. 9 depicts a magnified view of an underside surface of the cantilever 330 of length L (e.g., 100 microns), to which is affixed the cantilever tip 338. The cantilever tip 338 extends upward from the plane of FIG. 9, and is in electrical communication with the transmission line 370 through a 50 ohm input coplanar waveguide segment 410. The input coplanar waveguide segment 410, as well as a coplanar waveguide short-circuit differentiator 420, may be both be formed by gold (Au) depositions on the silicon nitride cantilever 330.

Referring to FIG. 9, the sawtooth waveform produced by the edge-generator 326 is carried to the tip 338 and to the short-circuit differentiator 420 by the input transmission line segment 410. Since the sawtooth waveform is inverted during reflection by the short circuit differentiator 420, the pulsed sampling waveform (FIG. 3) appears at the tip 338 as consequence of these reflected sawtooth patterns and those carried by the input transmission line segment 410. The width of the sampling pulses shown in FIG. 3 may be modified by adjusting the length of the short-circuit differentiator 420. Similarly, the repetition rate of the sampling waveform may be controlled by varying the frequency of the sinusoid produced by the frequency synthesizer 360.

The time resolution of the potentiometry system of the present invention is determined by the sampling pulse width. Thus the pulse generation circuitry will normally be designed to generate sharp pulses, generally with a duty cycle of ten percent or less, and preferably with a duty cycle of five percent or less. For example, when scanning a repeating surface waveform with a frequency of 20 GHz, the pulse durations of the sampling pulses should be less than five picoseconds, and preferably should be between 0.5 and 2.0 picoseconds in duration. In one experimental application of the invention, pulses of approximately 130 picosecond width were used for sampling a 500 megahertz (MHz) surface signal (i.e., the pulses had approximately a 6.5 percent duty cycle) with a pulse repetition frequency offset from 500 MHz by 10 Hz.

Referring again to FIG. 8, during tunneling mode operation the offset frequency mixing current through the microscope tip 338 is tapped from the microwave connector 374 by the current detection circuit 210. As discussed above, display of the mixing current by an oscilloscope or the like yields a low-frequency representation of the waveform $V_s(x,y,t)$ proximate a selected area of the high-speed circuit 302.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An apparatus for measuring an electrical waveform existing at the surface of a sample, said periodic waveform being of a predefined frequency, comprising:

a sampling signal generator that generates a sampling signal having a sample signal repetition frequency offset from said predefined repetition frequency by a difference frequency;

a probe coupled to said sampling signal generator for carrying said sampling signal to a position proximate and surface of said sample with a gap separating said probe from said surface so as to assert a time varying gap voltage across said gap, said time varying gap voltage generating a corresponding tunneling current through the gap between said probe and said surface of said sample; wherein said tunneling current is a nonlinear function of said gap voltage such that said tunneling current includes a mixing component that replicates said electrical waveform at a repetition rate equal to said difference frequency; and a current detection circuit coupled to said probe that senses said mixing component of said tunneling current.

2. The apparatus of claim 1 wherein said probe includes a tip member, and wherein said sampling signal generator generates a periodic pulsed waveform with a repetition frequency equal to said sampling frequency.

3. The apparatus of claim 2 wherein said current detection circuit includes a low pass frequency filter having a passband that includes said difference frequency.

4. An apparatus for measuring an electrical waveform existing at the surface of sample, said periodic waveform being of a predefined frequency, comprising:

a sampling signal generator that generates a sampling signal having a sample signal repetition frequency offset from said predefined repetition frequency by a difference frequency;

a cantilever coupled to said sampling signal generator for carrying said sampling signal to a position proximate the surface of said sample so as to assert a time varying voltage between said cantilever and said sample, said time varying gap voltage generating a corresponding tunneling current through said cantilever and said surface of said sample; wherein said tunneling current is a nonlinear function of said time varying voltage such that said tunneling current includes a mixing component that replicates said electrical waveform at a repetition rate equal to said difference frequency; and a current detection circuit coupled to said probe tip that senses said mixing component of said tunneling current and thereby generates a signal that replicates said electrical waveform at a repetition rate equal to said difference frequency.

5. A method for measuring a periodic electrical waveform existing proximate the surface of a sample, said periodic waveform having a predefined repetition frequency, comprising the steps of:

generating a sampling signal having a sample signal repetition frequency offset from said predefined frequency by a difference frequency;

transmitting said sampling signal along a signal path integrated with a cantilever to a position proximate the surface of said sample so as to assert a time varying voltage between said cantilever and said sample, said time varying voltage generating a corresponding tunneling current through said cantilever and said surface of said sample; wherein said tunneling current is a nonlinear function of said time varying voltage such that said tunneling current includes a mixing component that replicates said electrical waveform at a repetition rate equal to said difference frequency; and sensing said mixing component of said tunneling current and thereby generating a signal that replicates said electrical waveform at a repetition rate equal to said difference frequency.

6. The method of claim 5 wherein said cantilever includes a tip member in electrical communication with said signal path, said transmitting step including applying said sampling signal to said cantilever such that said signal path traversed by said sampling signal is less than one millimeter.

7. The method of claim 6 wherein said sensing step includes filtering said tunneling current with a filter having a passband that includes said difference frequency.

8. The method of claim 6 wherein said tip member is formed from a metal and said surface includes a semiconductor material, further including the step of placing said tip member in contact with said surface so as to form a metal-semiconductor contact mixer.

9. The method of claim 5, said generating step including generating a periodic pulsed waveform with a repetition frequency equal to said sampling frequency.

10. The apparatus of claim 4 wherein said tip member is formed from a metal and said surface includes a semiconductor material, said tip member being placed in contact with said surface so as to form a metal-semiconductor contact mixer.

11. A method for measuring a periodic electrical waveform existing proximate the surface of a sample, said periodic waveform having a predefined repetition frequency, comprising the steps of:

generating a sampling signal having a sample signal repetition frequency offset from said predefined frequency by a difference frequency;

transmitting said sampling signal along a signal path integrated with a probe to a position proximate the surface of said sample so as to assert a time varying voltage between said probe and said sample, said time varying voltage generating a corresponding tunneling current through said probe and said surface of said sample; wherein said tunneling current is a nonlinear function of said time varying voltage such that said tunneling current includes a mixing component that replicates said electrical waveform at a repetition rate equal to said difference frequency; and sensing said mixing component of said tunneling current and thereby generating a signal that replicates said electrical waveform at a repetition rate equal to said difference frequency.

12. The method of claim 11 wherein said probe includes a tip member in electrical communication with said signal path, said transmitting step including applying said sampling signal to said cantilever such that said signal path traversed by said sampling signal is less than one millimeter.

13. The method of claim 11 wherein said sensing step includes filtering said tunneling current with a filter having a passband that includes said difference frequency.

14. The method of claim 11 wherein said probe includes a tip member formed from a metal and said surface includes a semiconductor material, further including the step of placing said tip member in contact with said surface so as to form a metal-semiconductor contact mixer.

15. The method of claim 11, said generating step including generating a periodic pulsed waveform with a repetition frequency equal to said sampling frequency.

* * * * *

UNITED STATES PATENT AND TRADEMARK OFFICE
CERTIFICATE OF CORRECTION

PATENT NO. : 5,488,305
DATED : January 30, 1996
INVENTOR(S) : Bloom, et al.

It is certified that error appears in the above-indentified patent and that said Letters Patent is hereby corrected as shown below:

At column 1, line 4, just below the title, insert --This invention was made with Government support under Grant No. N00014-92-J-1769 awarded by the Departmentof the Navy. The Government has certain rights in this invention.--

Signed and Sealed this

Twenty-fifth Day of February, 1997

Attest:

BRUCE LEHMAN

*Attesting Officer*  *Commissioner of Patents and Trademarks*